Figures 1, 2, 3, 4:
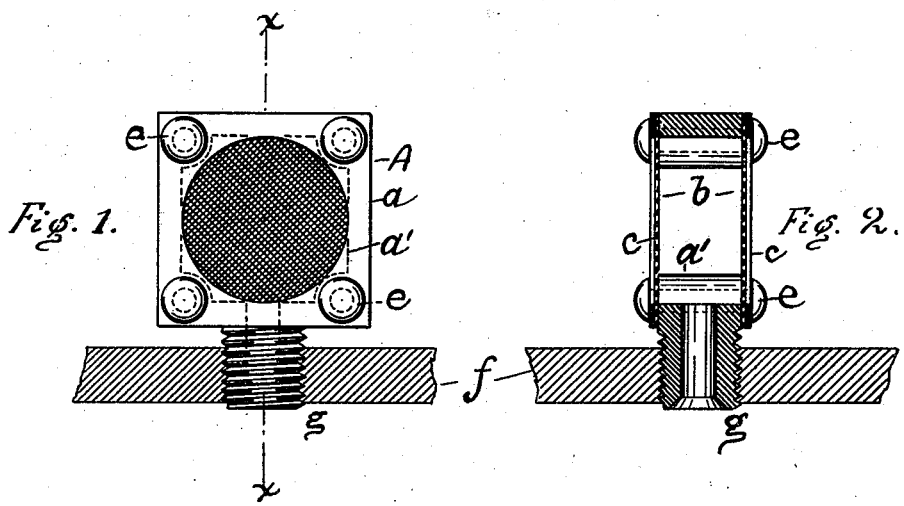

No. 690,541. Patented Jan. 7, 1902.
W. WAGNER.
FILTER STRAINER.
(Application filed May 24, 1901.)
(No Model.)

Witnesses
Inventor
Walter Wagner
By his Attorney

UNITED STATES PATENT OFFICE.

WALTER WAGNER, OF BERWYN, ILLINOIS.

FILTER-STRAINER.

SPECIFICATION forming part of Letters Patent No. 690,541, dated January 7, 1902.

Application filed May 24, 1901. Serial No. 61,788. (No model.)

*To all whom it may concern:*

Be it known that I, WALTER WAGNER, a citizen of the United States, residing at Berwyn, in the county of Cook and State of Illinois, have invented certain new and useful Improvements in Filter-Strainers, which are fully set forth in the following specification, reference being had to the accompanying drawings, forming a part hereof, and in which—

Figure 1 shows my said new filter-strainer in side elevation attached to the bottom of a fragment of a filter-basin. Fig. 2 shows a transverse section of Fig. 1 on the cutting-plane $x \, x$. Fig. 3 shows a screen-holder in elevation. Fig. 4 shows a screen in elevation.

Like reference-letters denote like parts.

The object of my invention is to produce a strainer for reversible-current filters which shall be simpler and cheaper of construction than those now in use and wherein the screens shall not be subjected to the weight of the filtering-sand above them nor to the direct action of the reversed current when washing the filter-bed.

To attain said desirable end, I construct my said strainer in substantially the following manner, namely: I make a cast rectangular body A, having the exterior outline $a$ and the interior outline $a'$, which is parallel with said exterior outline except at the corners, wherein there is a quarter-round fillet to give sufficient material for the rivet-holes $e$. The bottom of the body A is provided with a screw-threaded tubular stem $g$, by means of which it is attached to the filter-bottom $f$ and through which the water flows in or out, according to the direction given to it. Both edges or end faces of the frame A are parallel to each other and smooth to receive and make a close joint with the screens $b$, which are provided with rivet-holes near their corners, as shown, and upon each of which said screens is laid a guard or screen-holder $c$, having an opening $h$, whereof the circumference extends to or slightly beyond the edge or line $a'$ of the frame A.

In my said construction the cast case A carries the sand above it and when the reversed or washing current flows from the stem $g$ into A the sand such current carries impinges against the inner face of the frame A and not on the screen, and thereby saves the screen from the wear and injury which it is subjected to where the said washing-current flows with more or less direct action against the screen, which thereby suffers quick wear, especially so when much sand is accidentally in the flowing water.

What I claim is—

1. The combination with a reversible-current gravity filter-bed, of a hollow-stemmed screen-holder provided with screens on its ends, said screens being vertical to the plane of said bed, substantially as specified.

2. A filter-strainer consisting of a case with parallel screen ends and a screw-stem to said case axially parallel with the screens, guards to said screens, and means for fastening said parts together, substantially as specified.

3. A filter-strainer consisting of a frame having parallel screen ends, a stem between said ends with axis parallel thereto, screens, and screen-guards provided with discharge-openings, rivet-openings to said guards and screens, and rivets to unite said parts, substantially as specified.

WALTER WAGNER.

Witnesses:
WM. ZIMMERMAN,
JOHN S. HARGER.